United States Patent [19]

Schulte

[11] 4,410,046

[45] Oct. 18, 1983

[54] DEVICE FOR REGULATING THE TRACTIVE FORCE IN LOWER LINKAGES OF TRACTOR LIFTING GEAR

[75] Inventor: Heinz Schulte, Marktheidenfeld, Fed. Rep. of Germany

[73] Assignee: G. L. Rexroth GmbH, Lohr, Fed. Rep. of Germany

[21] Appl. No.: 270,028

[22] Filed: Jun. 3, 1981

[30] Foreign Application Priority Data

Jun. 10, 1980 [DE] Fed. Rep. of Germany ....... 3021777

[51] Int. Cl.³ ............................................ A01B 63/112
[52] U.S. Cl. ....................................................... 172/7
[58] Field of Search ................................ 172/7, 9, 10; 280/446 R, 446 A; 73/847, 848

[56] References Cited

U.S. PATENT DOCUMENTS

| | | | |
|---|---|---|---|
| 3,239,013 | 3/1966 | Hanssmann | 172/10 |
| 3,246,702 | 4/1966 | Carlin | 172/10 |
| 3,342,274 | 9/1967 | Wridt, Jr. | 172/7 |
| 3,390,575 | 7/1968 | Hukle | 73/847 X |
| 3,994,348 | 11/1976 | Schowalter | 172/9 |
| 4,059,159 | 11/1977 | Moorhouse et al. | 172/7 |
| 4,315,548 | 2/1982 | Nakamura et al. | 172/7 |

*Primary Examiner*—Richard T. Stouffer
*Attorney, Agent, or Firm*—Oblon, Fisher, Spivak, McClelland & Maier

[57] ABSTRACT

The invention provides a device for regulating the tractive force in the lower linkage system of a tractor lifting gear which serves, for example, to hold a plough. The lower linkages on which the tractive resistance, acting on the plough, is exerted transmit the tractive force to a bending bar, the bending of which is recorded as a measurement of the tractive force. In accordance with the invention the bending bar is rigidly coupled to a bearing frame which is rigidly mounted on the tractor and which absorbs the force acting on the lower linkages while the bending bar is subjected to bending strain. This means that the lower linkages do not exert a force directly on the bending bar, and the bending bar can therefore be supported free from play.

9 Claims, 5 Drawing Figures

DEVICE FOR REGULATING THE TRACTIVE FORCE IN LOWER LINKAGES OF TRACTOR LIFTING GEAR

The invention relates to a device for regulating the tractive force in the lower linkages of a tractor lifting gear.

Conventional devices of the above-mentioned type have an actual or instantaneous value recorder for the force in the lower linkages in the form of a bending bar which is mounted on the rear of the tractor in such a way that, when loaded, for example by the tractive force during ploughing, the bending bar is deflected in a quite specific manner. The bending bar is mounted symmetrically on the rear of the tractor and it forms, with its ends projecting above the bearings, the link pins for the lower linkages. The deflection of the bending bar is dependent on the tractive force, and it is determined by the variable distance measured between a fixed point on the tractor and the maximum deflection/displacement of the bending bar. The measured distance is the controlled variable for the feedback transducer.

This device has the disadvantage that, during this measurement of force, the bearing clearance in the event of load changes (from the tractive to the compressive load range, and vice versa) is included as a measurable variable for the tractive force or compressive force to be measured.

The object underlying the invention is therefore to provide a device for regulating the tractive force in the lower linkage of a tractor lifting gear, in which the bearing clearance of the bending bar does not have any influence on the function of the controller.

The replacement, in accordance with the invention, of the bending bar by a bracing, which is rigidly connected to a tractor-mounted bearing frame consisting of longitudinal sections or a linkage frame and which can be deformed while the forces of the lower linkages are initiated, ensures that the measurement transducer measuring the deformation of the bending bar no longer exhibits a 'jump' in the recording of measured values when the lower linkage force changes from the compressive to the tractive force range, or vice versa.

In this case the measurement transducer can as before be mounted on the towing vehicle.

However, it is particularly advantageous if the measurement transducer, uncoupled from the tractor, is seated directly on the bending bar, because in this way relative movements between the tractor and bearing frame or lower linkage cease to have any effect on the measurement transducer.

A preferred embodiment of the present invention results in a particularly simple and judicious arrangement of the device. In this connection the longitudinal trailing links or swinging arms absorb a major part of the tractive and compressive forces of the lower linkages; only a smaller proportion of the force of the lower linkages causes deformation of the bending bar. As a result, the latter can have smaller dimensions in relation to prior art without the reliability or durability of the device being reduced. Since the bending bar must be machined from a special material and must have a special quality, this device also provides an economic or commercial advantage.

A further particularly advantageous result may be obtained in accordance with a preferred embodiment of the invention. Any transverse movements of the bending bar which may occur upon deflection of the bearing frame at right angles to the direction of the lower linkages-for example, when loads are transported-can no longer transmit transverse shearing forces to the measurement transducer. As a result, the measurement transducer is protected from the introduction of undefined shearing stresses, and the reading or indicating accuracy of the device is increased.

BRIEF DESCRIPTION OF THE DRAWINGS

Several embodiments of the invention are described in more detail below with the aid of diagrammatic drawings. In the drawings.

DETAILED DESCRIPTION OF THE PRESENTLY PREFERRED EMBODIMENTS

Figure 1:
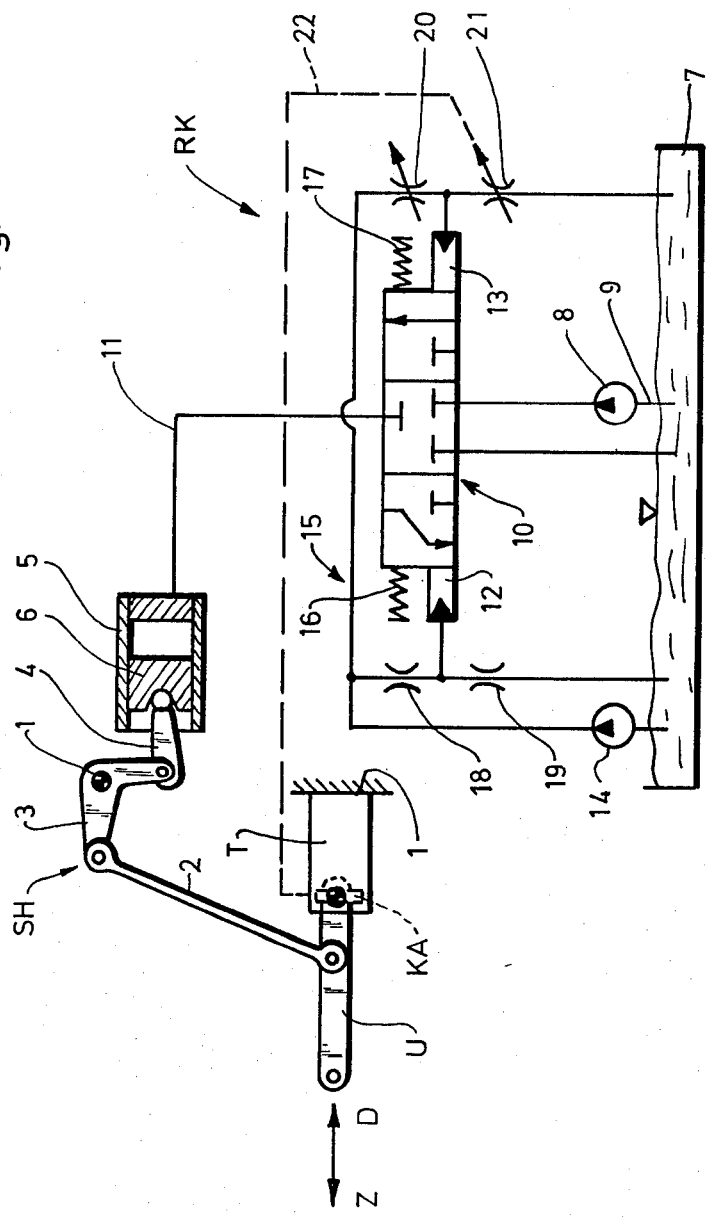
FIG. 1 shows a hydraulic control diagram of a control circuit for regulating the tractive force in the lower linkages of a hydraulically actuated lifting gear of a tractor.

FIG. 1 shows a hydraulic control circuit for regulating the tractive and compressive forces Z and D, respectively, in the lower linkages U of a tractor lifting gear SH. Each lower linkage system U is articulated to the tractor 1 by one end via a bearing frame T and connected to a hydraulically actuated working cylinder 5 via a lifting mechanism consisting of a lifting linkage 2, a bell-crank lever 3 and a slide rod 4. The other end of the lower linkage U is connected to a working equipment, for example a plough, the force (tractive force) of which is proportional to the ploughing depth, i.e. to the position of the lower linkage U. In order to keep a constant ploughing depth, the working cylinder 5 is controlled by a directional control valve 10 integrated in a control circuit RK which also operates hydraulically. However, it is also conceivable to have a control circuit which operates electrically and which, for example, displaces the valve by way of servomotors or controls the working piston directly by electrical means so that the control system is no longer dependent on the hydraulic system of the tractor.

In the illustrated case the working cylinder 5 is supplied with hydraulic fluid from a storage reservoir 7 via a working line 11. For this purpose a working pump 8 takes in hydraulic fluid through a suction line 9 and pumps it via the directional control valve 10 (in the illustrated case, a 3/3-way valve) to the working cylinder 5 where the fluid performs work while displacing a lifting piston 6.

The three-way directional control valve 10 is controlled by a control pressure circuit via control devices 12 and 13 arranged on both sides of the valve. The control pressure circuit has a control pump 14 which supplies the control circuit with hydraulic fluid via a supply network 15. When control devices 12 or 13 are not being actuated, the directional control valve 10 is maintained in the illustrated central position by a set of control springs 16 and 17. On one side of the directional control valve 10 a pressure is applied which is determined by two fixed jets 18 and 19. The pressure on the other side of the directional control valve 10 is determined by the drop in pressure at the two variable throttles 20 and 21. The throttle 20 functions as a set-point adjuster and the throttle 21 as a feedback transducer of the control circuit. The throttle 21 is connected to a force transducer KA (not shown) for the lower linkage U by mechanical, electrical or hydraulic coupling means (indicated by reference numeral 22) so that this connection serves as a feedback for the control circuit.

The illustrated position represents the adjusted or reset position of the directional control valve 10. In this case the throttle 20 determines the height of the lower linkage. The tractive force Z or the compressive force D in the lower linkage U is such that the pressure between the two throttles 20 and 21 is equal to the pressure between the two fixed jets 18 and 19.

If for some reason the force in the lower linkage deviates from the adjusted value, for example when the plough penetrates too deeply into the soil when ploughing over a rise in the ground, the throttle cross-section of the feedback transducer (throttle 21) changes and the pressure which becomes effective on the control device 13 increases. Since the pressure on the side of the control device 12 is constant, the directional control valve 10 is in this case displaced into a position in which hydraulic fluid is pumped into the working cylinder 5 so that the lower linkage U is lifted by way of the lifting mechanism. The force in the lower linkage U is reduced thereby and the throttle 21 is re-opened slightly so as to establish a new state of equilibrium in which the force in the lower linkage is reset, but the position of the lower linkage is changed.

Figure 2:
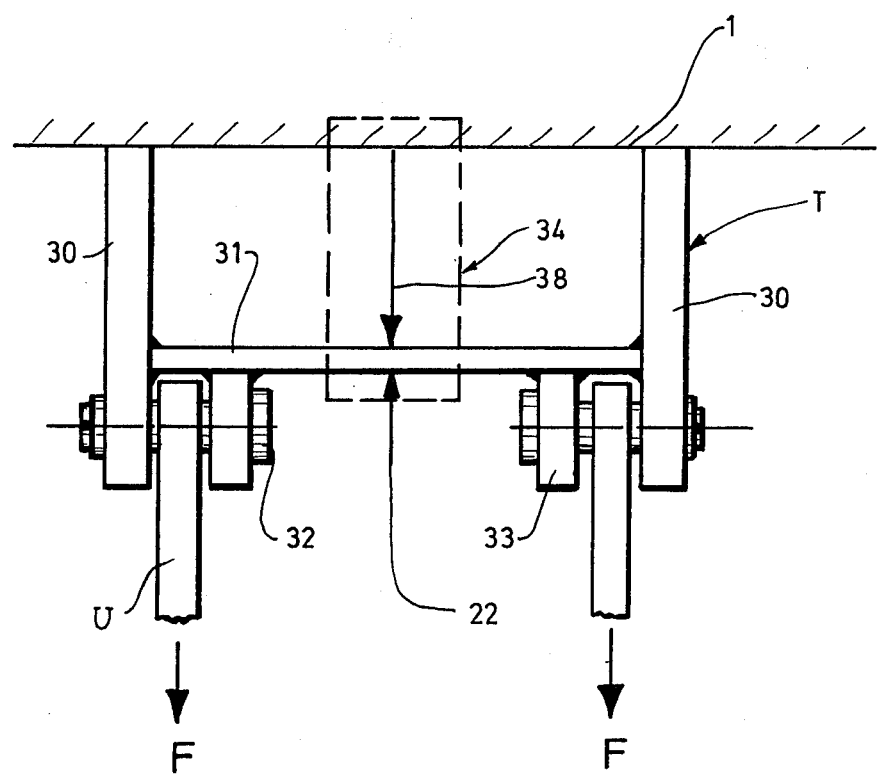
FIG. 2 shows a diagrammatic view of a device for generating a controlled variable which is proportional to the tractive force in the lower linkages, with a first embodiment of the measurement transducer arrangement.

FIG. 2 shows the construction of a device for generating the controlled variable, which is proportional to the tractive force in the lower linkages, for the throttle valve of the control circuit. The device is of symmetrical construction and has a bearing frame T consisting of two longitudinal linkage sections 30 which are arranged parallel to one another, which are aligned in the direction of travel, and which are connected to the tractor 1. A bending bar 31, which is welded to the linkage sections 30, acts as a bracing for the latter and forms a closed frame. The linkage sections 30 project slightly above the bending bar 31 and, in these projecting sections, they each receive a pin 32 which extends through a further bearing plate 33 rigidly connected, for example welded, to the bending bar 31. Each lower linkage U is mounted by way one of the pins 32. When the lower linkages U are under load, the closed frame is deformed elastically and symmetrically, the bending bar undergoing the greatest deformation. This displacement caused by deformation is recorded by a measurement transducer 34 which is mounted on the tractor 1 and which, by way of a key 38, transmits the deflection of the bending bar 31 to the feedback transducer (throttle 21) via the coupling means 22.

Figure 3:
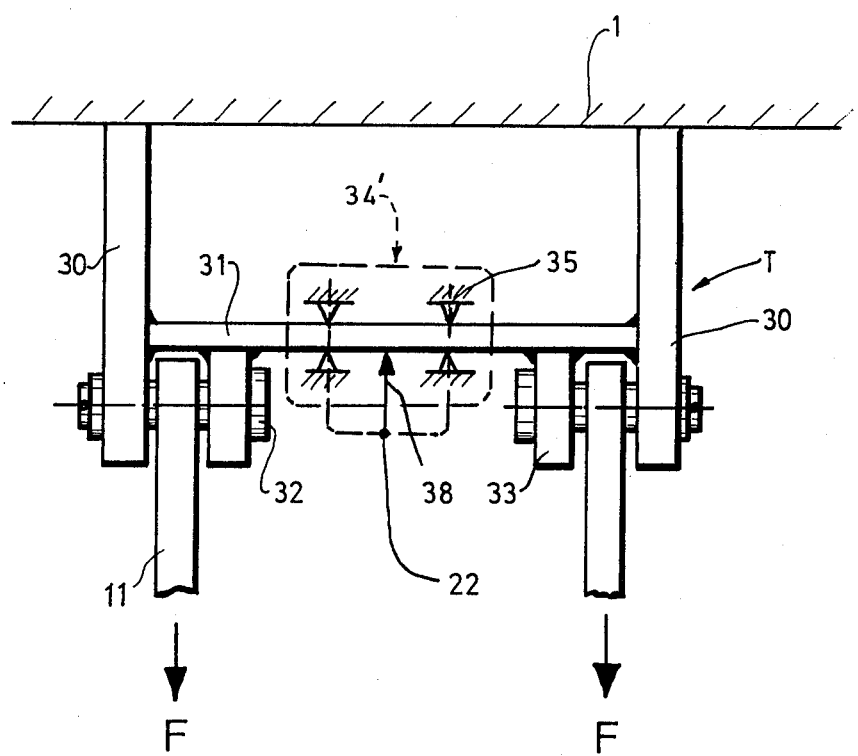
FIG. 3 shows a view similar to FIG. 2, with a second embodiment of the measurement transducer arrangement.

FIG. 3 shows a device having a construction substantially identical to that of the device shown in FIG. 2. However, the measurement transducer 34' is uncoupled from the tractor 1 and mounted on the centre of the bending bar 31. The key 38 transmits via the coupling means 22 a signal which is dependent on the deflection of the bending bar.

The measurement transducer 34' can operate, for example mechanically, by determining via a knife-edge bearing 35 a reference point on the bending bar 31 and determining, via the key 38 engaging resiliently on the bending bar 31, the relative deformation of the bending bar 31 and thus the force in the lower linkage U. The measurement transducer can, however, also operate electrically by determining directly the deformation of the bending bar 31 by inductive or capacitive means and transmitting it as an electric signal to the feedback transducer.

Figure 4:
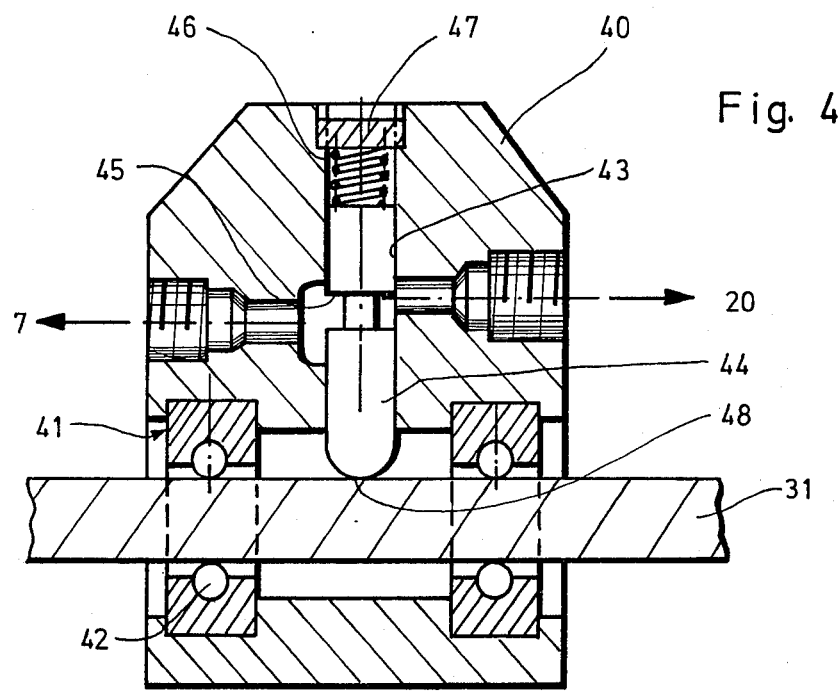
FIG. 4 shows a partial section through a first embodiment of a measurement transducer.

FIG. 4 shows an embodiment of a mechanically operating measurement transducer which is connected to the hydraulically operating control circuit via a mechanically operating coupling.

The measurement transducer is formed by a housing 40 which is mounted on the bending bar 31 by way of a double knife-edge bearing 41 in the form of fitted-on toroidal knife-edges 42. The housing 40 has a bore 43 which runs symmetrically relative to the bearings 41 and in which a slide valve 44 is slidably mounted to create a seal on its end sections. With the aid of a control edge 45, the slide valve throttles the hydraulic line, which is also integrated in the measurement transducer and leads to the storage reservoir 7, and thereby determines the pressure before the control device 13 (see FIG. 1). The outwardly curved end section 48 of the slide valve 44 is pressed against the bending bar 31 by means of a compression spring 46 which is supported on the housing 40 of the measurement transducer by way of a screw 47 screwed into the housing 40. The housing of the measurement transducer is mounted on the bending bar 31 in such a way that the bore 43 for the slide valve 44 points in the direction of maximum deflection of the bending bar.

When a tractive force F which exceeds the adjusted force of the linkages acts on the lower linkages U, the bending bar 31 is deflected away from the tractor 1 and the slide valve 44 which follows this deformation throttles the stream of hydraulic control fluid. The directional control valve 10 is displaced thereby and the working cylinder 5 is supplied with hydraulic fluid. As a result of this, the lower linkage U is lifted and the force transmitted thereby is reduced so that a state of equilibrium is re-established at the directional control valve 10.

In accordance with FIG. 2 the measurement transducers can also be connected rigidly to the tractor frame 1. As a result, the knife-edge bearings 41 can be omitted.

Figure 5:
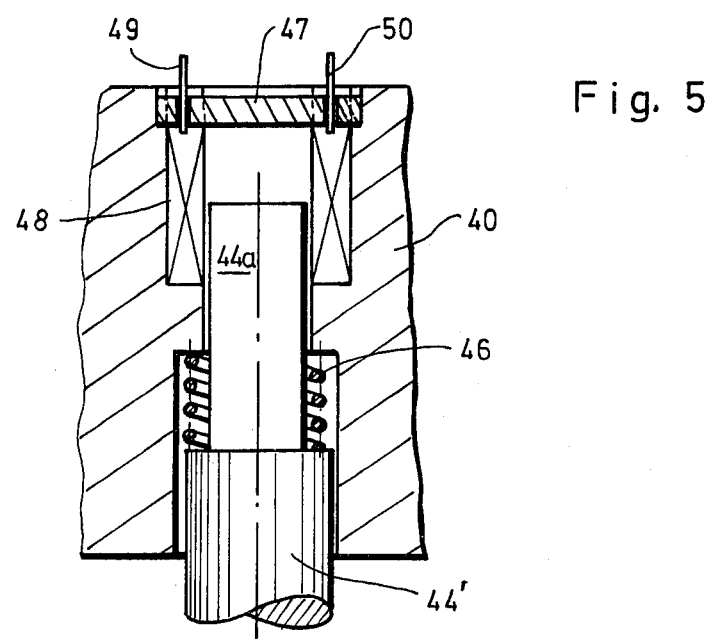
FIG. 5 shows a partial section through a further embodiment of a measurement transducer.

FIG. 5 shows an embodiment of the measurement transducer which could be used in electrical control circuits. In this case—as in the case described above—the housing 40 accomodates a plunger 44' which is pressed against the bending bar 31 by means of a compression spring 46. The upper section 44a of the plunger 44' is surrounded by a coil 48 which is connected to an electric control loop by the connections 49, 50 of its winding and which generates a corresponding electric signal depending on the position or movement of the plunger (which is conditional on the deflection of the bending bar).

I claim:

1. In a tractor device for regulating the tractive force therefore, said tractor including a lifting gear with a pair of lower linkages, said device comprising:
(a) a pair of linkage sections which are rigidly mounted on the tractor;

(b) each of said pair of lower linkages being pivotably connected to one of said pair of linkage sections such that said lower linkages act upon said linkage sections and said linkage sections absorb tractive and compressive forces which act on said lower linkages;

(c) a bending bar which is rigidly connected to each of said pair of linkage sections to form a closed frame, said bending bar being subjected to bending moments by reason of deflection in said linkage sections caused by tractive and compressive forces in said lower linkages; and (d) a measurement transducer which measures the deflection of said bending bar.

2. A device as recited in claim 1 wherein said measurement transducer is mounted on said bending bar.

3. A device as recited in claim 1 wherein said measurement transducer is mounted on the tractor.

4. A device as recited in claim 1 wherein:

(a) said linkage sections are parallel to one another and are aligned in the direction of travel of the tractor;

(b) said lower linkages are each articulated to said linkage sections by means of a pin; and (c) said bending bar is coupled to said pins.

5. A device as recited in claim 1 wherein said measurement transducer comprises:

(a) a housing which is supported on said bending bar by way of two spaced knife-edge bearings and (b) a displacement transducer mounted in said housing between said knife-edge bearings.

6. A device as recited in claim 5 wherein said measurement transducer operates mechanically.

7. A device as recited in claim 6 wherein said measurement transducer comprises:

(a) a slider which is slidably mounted in said housing;

(b) means for biasing said slider into engagement with said bending bar; and (c) a regulating valve which is operatively controlled by said slider 8. A device as recited in claim 5 wherein said measurement transducer operates electrically.

9. A device as recited in claim 8 wherein said measurement transducer comprises:

(a) a plunger which is slidably mounted in said housing;

(b) means for biasing said plunger into engagement with said bending bar; and (c) a coil which is rigidly mounted in said housing and which receives said plunger such that said plunger moves axially in and out of said coil in response to deflection of said bending bar.

* * * * *